US011893699B2

(12) United States Patent
Patel et al.

(10) Patent No.: US 11,893,699 B2
(45) Date of Patent: Feb. 6, 2024

(54) METHOD AND PROCESSING UNIT FOR PROVIDING CONTENT IN A BANDWIDTH CONSTRAINED ENVIRONMENT

(71) Applicant: ZEALITY INC., Pleasanton, CA (US)

(72) Inventors: Dipak Mahendra Patel, Pleasanton, CA (US); Avram Maxwell Horowitz, San Francisco, CA (US); Karla Celina Varela-Huezo, San Francisco, CA (US)

(73) Assignee: Zeality Inc, Pleasanton, CA (US)

( * ) Notice: Subject to any disclaimer, the term of this patent is extended or adjusted under 35 U.S.C. 154(b) by 78 days.

(21) Appl. No.: 17/654,817

(22) Filed: Mar. 15, 2022

(65) Prior Publication Data
US 2023/0298276 A1 Sep. 21, 2023

(51) Int. Cl.
*G06T 19/00* (2011.01)
*G06V 10/25* (2022.01)
*G06T 7/70* (2017.01)
*G06F 3/01* (2006.01)
*G10L 15/18* (2013.01)
*G10L 15/22* (2006.01)

(52) U.S. Cl.
CPC ............ *G06T 19/006* (2013.01); *G06F 3/012* (2013.01); *G06F 3/013* (2013.01); *G06T 7/70* (2017.01); *G06V 10/25* (2022.01); *G10L 15/1815* (2013.01); *G10L 15/22* (2013.01); *G06T 2210/08* (2013.01)

(58) Field of Classification Search
CPC ............................ G06V 10/25; G06T 2210/08
See application file for complete search history.

(56) References Cited

U.S. PATENT DOCUMENTS

| 10,936,894 B2 | 3/2021 | Yang et al. |
| 2015/0281299 A1* | 10/2015 | Moustafa ............. H04L 65/756 709/219 |
| 2018/0070113 A1 | 3/2018 | Phillips et al. |
| 2018/0199078 A1* | 7/2018 | Beattie, Jr. ....... H04N 21/42201 |
| 2020/0349775 A1 | 11/2020 | Han et al. |
| 2022/0353465 A1* | 11/2022 | Smith .................... H04N 23/90 |

(Continued)

FOREIGN PATENT DOCUMENTS

| AU | 2017232207 B2 | 7/2021 |
| BR | 112019010875 A2 | 1/2019 |
| CN | 102460487 B | 8/2015 |

(Continued)

*Primary Examiner* — Ryan R Yang
(74) *Attorney, Agent, or Firm* — Riyon Rae Harding

(57) ABSTRACT

A method and processing unit for providing content in a bandwidth constrained environment is disclosed. Initially, a content along with audio inputs, which is received during rendering of the content and provided to one or more users in a bandwidth constrained environment is received. Further, at least one object of interest within the content and associated with the audio inputs is identified. One or more regions of interest, including the at least one object of interest, is determined in the bandwidth constrained environment. Upon determining the one or more regions of interest, bitrate for rendering the content is modified based on the determined one or more regions of interest, to obtain a modified content for the bandwidth constrained environment. The modified content is provided to be rendered in the bandwidth constrained environment.

17 Claims, 11 Drawing Sheets

(56) References Cited

U.S. PATENT DOCUMENTS

2023/0045884 A1* 2/2023 Huang .................. H04N 19/115
2023/0215129 A1* 7/2023 Ninan .................. H04N 13/383
382/190

FOREIGN PATENT DOCUMENTS

JP          2020061187 A    4/2020
JP          2020110005 A    7/2020

* cited by examiner

METHOD AND PROCESSING UNIT FOR PROVIDING CONTENT IN A BANDWIDTH CONSTRAINED ENVIRONMENT

FIELD OF THE PRESENT DISCLOSURE

Embodiments of the present invention generally relate to rendering content to one or more users. In particular, embodiments of the present invention relate to a method and processing unit for providing content to one or more users in a bandwidth constrained environment.

BACKGROUND OF THE DISCLOSURE

Users may be provided with rendered content like video, audio, and images over a transmission medium such as the Internet. Quality of the content, when rendering, depends in large part upon Bandwidth (BW) which is defined as the amount of information per unit of time that the transmission medium can handle. Larger BW will help providing better and higher quality rendered content to the user. The higher quality of the content can be achieved with respect to bitrate, resolution, frame rate, or quality of compression of the content.

In some cases, the environment in which the user is provided with the content may have constraints that affect the quality of the content. The environment may be a live-telecast environment, online streaming environment, extended reality/immersive environment, and so on, which provide content/information to the user. Usually, the constraint may be related to BW availability for providing the content. In BW constrained environment, providing content with higher quality may be a challenge. The quality of content may have to be compromised when serving a client in a bandwidth-constrained environment. In some cases, there may be a delay in the rendering of the content to the user. Overall, desired content with desired quality may not be provided to the user when there is BW constraint in the environment.

To overcome such issues related to BW, some of the conventional techniques teach compromising the quality of all of the content which is to be provided to the user. The quality of the content may be changed by modifying bitrate, resolution, frame rate, or quality of compression related to the content to be rendered. This will affect the user's experience with the content. In some cases, BW constraint may be overcome by adding BW in the transmission medium of the environment. However, such approaches are not cost efficient.

Therefore, there is a need for a method, system and unit which provides content in BW constrained environment without compromising user experience with the content and without the need of additional bandwidth.

The information disclosed in this background of the disclosure section is only for enhancement of understanding of the general background of the disclosure and should not be taken as an acknowledgement or any form of suggestion that this information forms existing information already known to a person skilled in the art.

BRIEF SUMMARY OF THE DISCLOSURE

A method, a processing unit, and a non-transitory computer-readable medium for providing content to one or more users in a bandwidth constrained environment are disclosed. Initially, content including audio inputs received during rendering of the content and provided to one or more users in a bandwidth constrained environment is received. The audio inputs are provided by at least one user from the one or more users. Further, at least one object of interest within the content and associated with the audio inputs is identified. One or more regions of interest, including the at least one object of interest, is determined in the bandwidth constrained environment. Upon determining the one or more regions of interest, bitrate for rendering the content is modified based on the determined one or more regions of interest, to obtain a modified content for the bandwidth constrained environment. The modified content is provided to be rendered in the bandwidth constrained environment.

In an embodiment, the one or more regions of interest is determined by identifying the presence of the at least one object in a frame from a series of frames of the content to be displayed to the one or more users. Further, the location of the at least one object of interest in the frame is identified. The location is selected to be the one or more regions of interest for the frame, for modifying the bitrate.

In an embodiment, the one or more regions of interest are determined by identifying presence of the at least one object in a frame from series of frames of the content to be displayed to the one or more users. Further, user actions of at least one user from the one or more users viewing the at least one object are monitored. The one or more regions of interest in the series of frames is updated based on the user actions.

In an embodiment, the user actions may include, without limitation, at least one of head movement and eyeball movement of the at least one user.

In an embodiment, at least one object of interest associated with the audio inputs is identified by processing the audio inputs using a Natural Language Processing (NLP) model associated with the processing unit, to derive context related to the at least one object of interest. Further, the at least one object is identified based on the derived context.

In an embodiment, the bitrate for rendering the content is modified by increasing bitrate for rendering the one or more regions of interest of the content in the bandwidth constrained environment and decreasing bitrate for rendering regions other than the one or more regions of interest, of the content in the bandwidth constrained environment.

In an embodiment, the environment may be an immersive environment and the content is an immersive content to be rendered to the one or more users.

The features and advantages of the subject matter hereof will become more apparent in light of the following detailed description of selected embodiments, as illustrated in the accompanying FIGUREs. As one of ordinary skill in the art will realize, the subject matter disclosed is capable of modifications in various respects, all without departing from the scope of the subject matter described and claimed herein. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
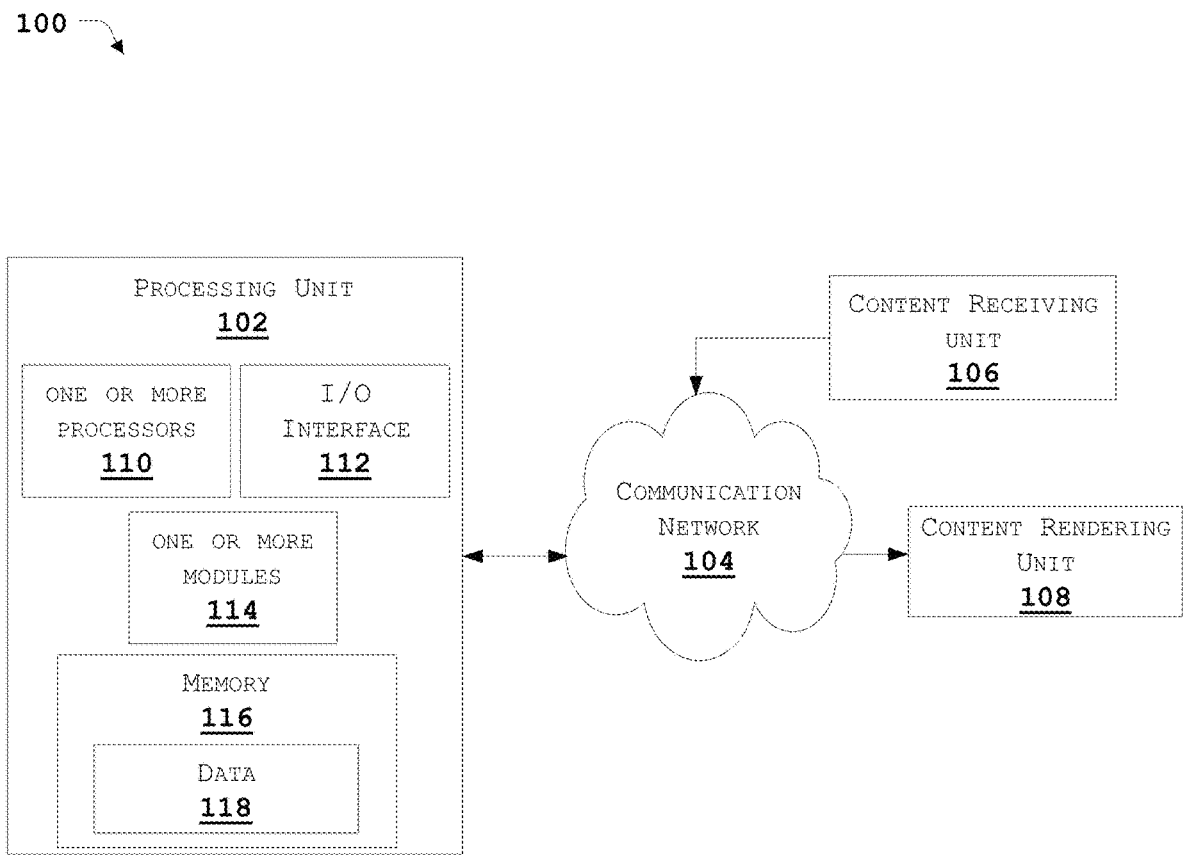
FIG. 1 illustrates an exemplary environment with processing unit for providing content in a bandwidth constrained environment, in accordance with an embodiment of the present disclosure.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, semiconductor memories, such as ROMs, PROMs, random access memories (RAMs), programmable read-only memories (PROMs), erasable PROMs (EPROMs), electrically erasable PROMs (EEPROMs), flash memory or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present disclosure relate to a method, processing unit and programmable storage medium for providing content in a bandwidth constrained environment. The content is modified and rendered such that user experience in the bandwidth constrained environment is not compromised. The proposed invention teaches the consideration of audio inputs that provided to the one or more users during rendering of the content. The audio inputs may relate to an object associated with the content. This object of interest is identified using the audio inputs. Based on the identified object of interest, regions of interest in the content to be displayed are determined. Further, bitrate for rendering the content is modified based on the determined regions of interest to obtain modified content. The modified content is provided for rendering in the bandwidth constrained environment. By modifying the bitrate based on the regions of interest, the quality of complete content is not reduced, but only a part of the content which is of interest to the user is provided with higher quality and rest of the part is provided with lower quality. Thus, desired content is provided without addition of bandwidth in the bandwidth constrained environment.

FIG. 1 illustrates an exemplary environment 100 with processing unit 102 for providing content in a bandwidth constrained environment, in accordance with an embodiment of the present disclosure. As shown in FIG. 1, the exemplary environment 100 comprises the processing unit 102, a communication network 104, a content receiving unit 106 and a content rendering unit 108. Further, the exemplary environment 100 may be implemented within a user device connected to the bandwidth constrained environment. In an embodiment, the bandwidth constrained environment may be any environment which renders content to one or more users. The content may be media including video, audio, images, and so on. Such environments may be, without limitation, an extended reality/immersive environment, a live-telecast environment, content streaming environment, visual communication based environment. The proposed processing unit 102 and method may be implemented in such an environment which is facing issues with rendering content due to bandwidth constraints. In an embodiment, the one or more users may be connected to the bandwidth constrained environment via user devices. The user devices may be at least one of a smartphone, a head mounted device, smart glasses, a television, a PC, tablet, laptop and so on. The content may be rendered to the user devices. The user device may be any device capable of receiving the content and able to render the content to the one or more users. The content may be displayed on such user device.

In an embodiment, the exemplary environment 100 may be implemented within a user device, connected to the bandwidth constrained environment. In an embodiment, the processing unit 102 may be communicatively coupled with the user device, and the content receiving unit 106 and the content rendering unit 108 may be part of the user device. In an embodiment, the processing unit 102 along with the content receiving unit 106 and the content rendering unit 108 may be communicatively coupled with the user device. When there are multiple users connected with the bandwidth constrained environment, the exemplary environment 100 may be communicatively coupled with each of the user devices associated with the multiple users. In an embodiment, the exemplary environment 100 may be implemented as a dedicated server associated with a single user device and communicatively coupled with other user devices connected to the bandwidth constrained environment.

In an embodiment, the exemplary environment 100 may be implemented as cloud-based server(s) connected with each of the user devices. In an alternate embodiment, the processing unit 102 alone may be implemented as a dedicated server or a cloud based sever.

Figure 2:
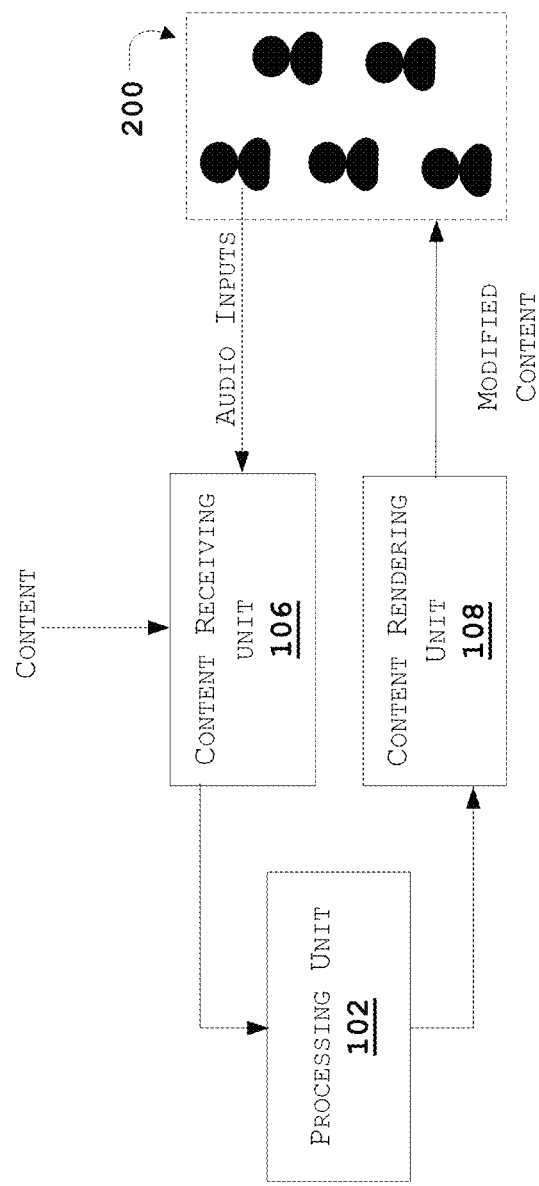
FIG. 2 shows an exemplary block diagram with processing unit for providing content in a bandwidth constrained environment, in accordance with an embodiment of the present disclosure.

FIG. 2 shows an exemplary block diagram with the processing unit 102 for rendering the content in the bandwidth constrained environment, in accordance with an embodiment of the present disclosure.

In an embodiment, the processing unit 102 is configured to render the content in the bandwidth constrained environment to one or more users 200. The processing unit 102 may be configured to function in real-time, when the one or more users 200 are viewing the content in the bandwidth constrained environment. The one or more users 200 may view the content via one or more user devices. In an embodiment, each of the one or more users 200 may be associated with a respective user device. In an alternate embodiment, the one or more users 200 may be associated with two or more user devices. For example, when the one or more users 200 comprises a presenter and one or more attendees, the presenter may be associated with a user device and the one or more attendees may be associated with at least one user device. The content rendered to the one or more user devices may be pre-defined content or dynamically generated content. During rendering of the content to the one or more users 200, audio inputs may also be provided to the one or more users. In a non-limiting embodiment, the audio input may be part of the content which is to be rendered in the bandwidth constrained environment. In another embodiment, the audio may be provided by at least one user from the one or more users 200 in real-time when rendering the content to the one or more users. In such case, the audio inputs may be dynamic in nature. For example, the audio input may be provided by the presenter. In an another embodiment, the audio inputs may be machine generated data. Such audio inputs may be pre-defined with associated time stamps. For example, comments provided by a user in a pre-recorded virtual tour of a house may be considered as a machine generated audio and may be part of the content. In an alternate embodiment, when rendering the content to the one or more users, some of the audio inputs may be part of the content and some of the audio inputs may be dynamically received along with the rendered content.

The content, which is provided to the one or more users 200, along with the audio inputs are simultaneously received by the content receiving unit 106. The content receiving unit 106 may be configured to provide the content and the audio input to the processing unit 102. The content may be information that is to be rendered to the one or more users 200. The content may be a steaming video, immersive content, recorded video, virtual content, live content and so on. In an embodiment, the content receiving unit 106 may be part of the user device on which the content is displayed and audio input is received. In an embodiment, the content receiving unit 106 may be the user device itself. In an alternate embodiment, the content receiving unit 106 may be integral part of the processing unit 102. In an embodiment, the content receiving unit 106 may function as a storage device which may, without limitation, include a cache or buffer, which temporally stores the content and the audio inputs. The stored content and the stored audio input may be communicated with the processing unit 102 dynamically, when received from the user device. In some non-limiting embodiments, the processing unit 102 may communicate with the content receiving unit 106 via the communication network 104. The communication network 104 may include, without limitation, a direct interconnection, a Local Area Network (LAN), a Wide Area Network (WAN), a wireless network (e.g., using Wireless Application Protocol), the Internet, and the like.

Using the content and the audio inputs, the processing unit 102 is configured to output a modified content which is provided to the one or more users 200 in the bandwidth constrained environment. The processing unit 102 is configured to modify the content based on the audio input. In an embodiment, the content may include series of frames that is rendered to the one or more users 200. The processing unit 102 may be configured to process one or more frames that is rendered to the one or more users 200, to modify subsequent frames which are to be rendered to the one or more users. In an embodiment, the modified content may include subsequent frames that are modified by the processing unit 102 and to be rendered to the one or more users 200, via user devices.

In an embodiment, the modified content outputted by the processing unit 102 is received by the content rendering unit 108. The content rendering unit 108 may be in communication with the user devices associated with the one or more users 200. The content rendering unit 108 may render the modified content to the one or more users 200 via the user devices. In an embodiment, the content rendering unit 108 may be integral part of the processing unit 102. In an alternate embodiment, the content rendering unit 108 may be integral part of user device to which the modified content is to be rendered. In such embodiment, each of the user devices associated with the one or more users may include a dedicated content rendering unit. Thus, the processing unit 102 may be in communication with each of content rendering units associated with the user devices (not shown in figure). In an embodiment, the content rendering unit 108 may function as a storage device which may include, without limitation, a cache or a buffer, which temporally stores the modified content. The stored modified content may be communicated with the user devices dynamically, when received from the processing unit 102. In some non-limiting embodiments, the processing unit 102 may communicate with the content rendering unit 108 via the communication network 104. The communication network 104 may include, without limitation, a direct interconnection, a Local Area Network (LAN), a Wide Area Network (WAN), a wireless network (e.g., using Wireless Application Protocol), the Internet, and the like.

In an embodiment, the processing unit 102 may communicate with the content receiving unit 106 and the content rendering unit 108 via a single communication network as shown in FIG. 1 and FIG. 2. In an alternate embodiment, the processing unit 102 may communicate with each of the content receiving unit 106 and the content rendering unit 108 via a dedicated communication network (not shown in Figures).

Figure 3:
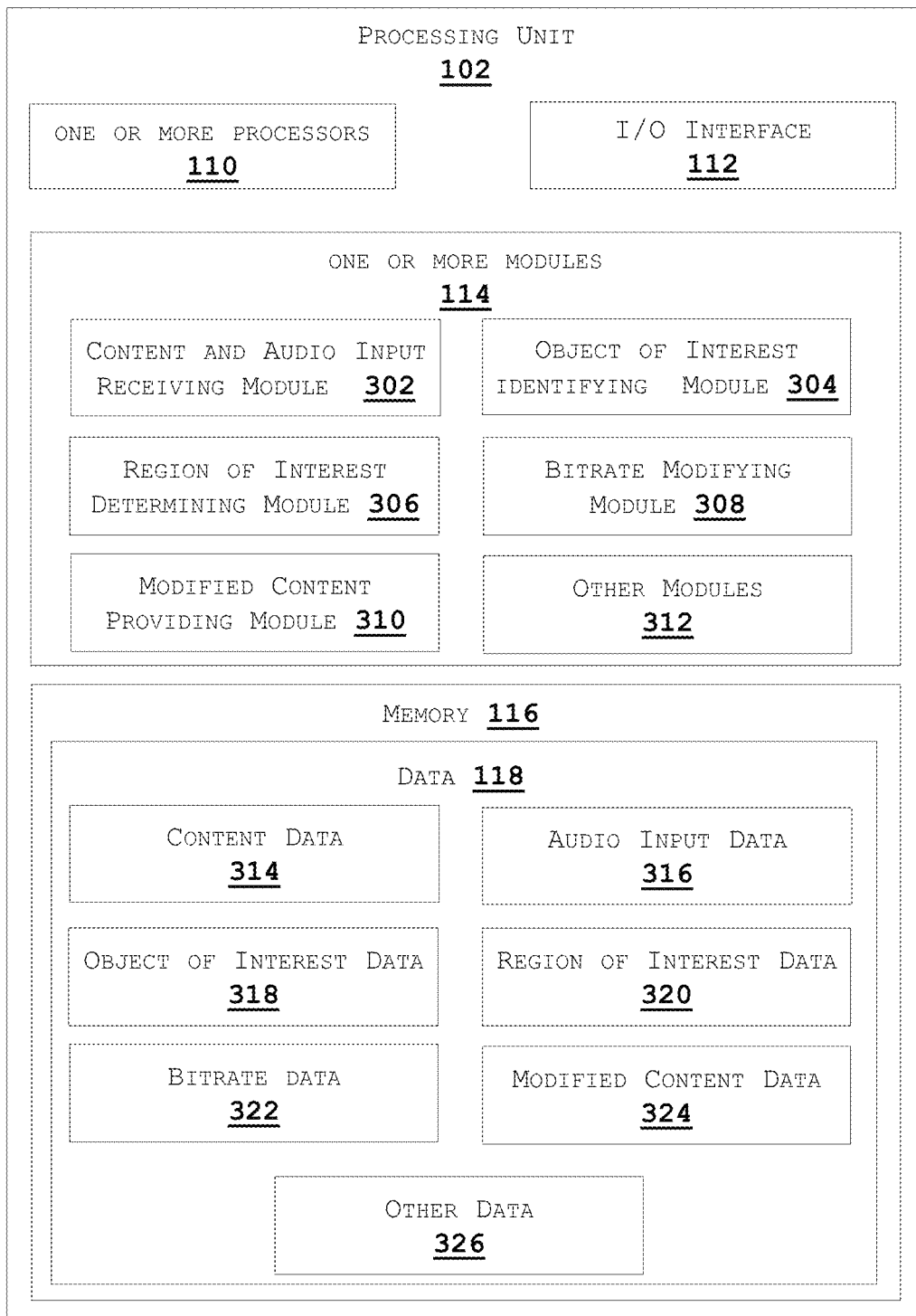
FIG. 3 illustrates a detailed block diagram showing functional modules of a processing unit for providing content in a bandwidth constrained environment, in accordance with an embodiment of the present disclosure.

FIG. 3 shows a detailed block diagram of the processing unit 102 for providing content in the bandwidth constrained environment, in accordance with some non-limiting embodiments or aspects of the present disclosure. The processing unit 102 may include one or more processors 110, an Input/Output (I/O) interface 112, one or more modules 114 and a memory 116. In some non-limiting embodiments or aspects, the memory 116 may be communicatively coupled to the one or more processors 110. The memory 116 stores instructions, executable by the one or more processors 110, which on execution, may cause the processing unit 102 to render the content data in the bandwidth constrained environment. In some non-limiting embodiments or aspects, the memory 116 may include data 118. The one or more modules 114 may be configured to perform the steps of the present disclosure using the data 118 to control the access. In some non-limiting embodiments or aspects, each of the one or more modules 114 may be a hardware unit, which may be outside the memory 116 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like.

The data 118 in the memory 116, and the one or more modules 114 of the processing unit 102 are described herein in detail. In one implementation, the one or more modules 114 may include, but are not limited to, a content and audio input receiving module 302, an object of interest identifying module 304, a region of interest determining module 306, a bitrate modifying module 308, a modified content providing module 310 and one or more other modules 312 associated with the processing unit 102. In some non-limiting embodiments or aspects, the data 118 in the memory 116 may include content data 314 (herewith also referred to as content 314), audio input data 316 (herewith also referred to as audio input 316 or audio inputs 316), object of interest data 318 (herewith also referred to as at least one object of interest 318), region of interest data 320 (herewith also referred to as one or more regions of interest 320), bitrate data 322, modified content data 324 (herewith also referred to as modified content 324) and other data 326 associated with the processing unit 102.

In some non-limiting embodiments or aspects, the data 118 in the memory 116 may be processed by the one or more modules 114 of the processing unit 102. In some non-limiting embodiments or aspects, the one or more modules 114 may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 114 of the present disclosure function to control the access to the virtual and real-world environment. The one or more modules 114 along with the data 118, may be implemented in any system for the rendering the content in the bandwidth constrained environment. In a non-limiting embodiment, at least one of the one or more modules 114 may be implemented to be a cloud-based server configured to perform respective functionality. Such modules may be communicatively coupled with the processing unit 102.

For rendering the content in the bandwidth constrained environment, the content and audio input receiving module 302 may be configured to receive the content 314 along with the audio inputs 316. The content 314 is data or information that is provided to the one or more users in the bandwidth constrained environment. The content 314 may be live content, immersive content, augmented content, streaming content, and so on. Audio inputs 316 may be commands or narration associated with the content rendered to the one or more users. In an embodiment, the audio inputs 316 may be provided by at least one user from the one or more users 200. In an embodiment, the audio inputs 316 may be predefined audio data which is stored and rendered along with the content to the one or more users. In another embodiment, the audio inputs 316 may be machine generated dynamically based on the content that is to be generated. The audio inputs 316 may be provided during rendering of the content 314.

Figure 4A:
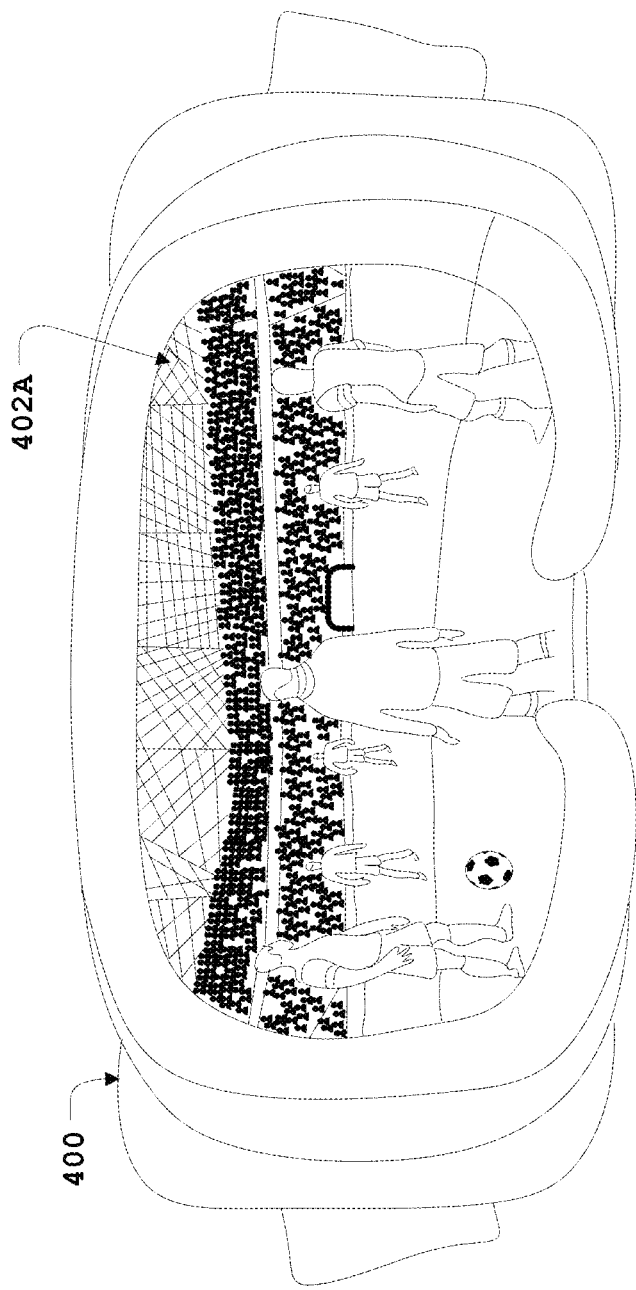
FIGS. 4A-4C show exemplary embodiments for providing content in an immersive environment with bandwidth constraints, in accordance with an embodiment of the present disclosure.

For example, consider the bandwidth constrained environment is an online classroom environment with lecturer and students as the one or more users 200. Display viewed by the one or more students during lecture provided by the lecturer may be the content 314 rendered to the one or more students. The narration of the lecturer during the rendering of the content 314 may be considered as the audio inputs 316. Similarly, consider a scenario illustrated in FIG. 4a and FIG. 4b. The bandwidth constrained environment is a virtual telecast of a sport with a commentator 404 and one or more audience members viewing the sport. The commentator 404 and the one or more audience members are the one or more users 200. Display of the virtual telecast may be the content 314 and vocal comments provided by the commentator may be the audio inputs 316. To experience the virtual telecast, each of the one or more users 200 are required to be using a user device to which the content 314 is rendered. As shown in FIG. 4a, user device may be a head-mounted device 400 to which the content 314 is rendered. In an alternate embodiment, the one or more users 200 may be wearing smart glasses to experience the virtual telecast of the sport. In a non-limiting embodiment, the content 314 may be rendered to one or more other devices which is compatible to display the virtual telecast of the sport. The content and audio input receiving module 302 is configured to receive the content 314 and the audio inputs 316 which is rendered to the one or more users 200, simultaneously.

Upon receiving the content 314 and the audio inputs 316, the object of interest identifying module 304 may be configured to identify at least one object of interest 318. The at least one object of interest 318 may be identified in the content 314 that is displayed, based on the audio inputs 316. In a non-limiting embodiment, the at least one object of interest 318 may be identified by processing the audio inputs 316 using a Natural Language Processing (NLP) model. In an embodiment, the NLP model may be integral part of the object of interest identifying module 304. In another embodiment, an NLP model may be implemented in a server and the object of interest identifying module 304 may be communicatively coupled with such server. In such embodiment, the object of interest identifying module 304 may communicate the audio inputs 316 to the server for the processing. By processing, context related to the at least one object of interest 318 may be derived from the audio inputs 316. In an embodiment, the NLP model may be trained using plurality of pre-defined objects, corresponding context, and corresponding pre-defined audio inputs. In an embodiment, the NLP model may be configured to perform semantic analysis of the audio inputs 316 to derive the context related to the at least one object of interest 318. In a non-limiting embodiment, one or more NLP models, known to a person skilled in the art, may be implemented to derive the context from the audio inputs 316. Such NLP models may include, but are not limited to, Bidirectional Encoder Representations from Transformers (BERT), Robustly Optimized BERT Pretraining Approach (RoBERTa), OpenAI's GPT-3, ALBERT, XLNet, OpenAI's GPT2, StructBERT, Text-to-Text Transfer Transformer (T5) and so on. In a non-limiting embodiment, one or more other techniques, known to a person skilled in the art, may be implemented to derive the context using the audio inputs 316.

Upon deriving the context using the audio inputs 316, the object of interest identifying module 304 may be configured to identify the at least one object of interest, based on the context. The at least one object of interest may be one or more objects that are displayed to the one or more users when rendering the content 314.

Figure 4B:
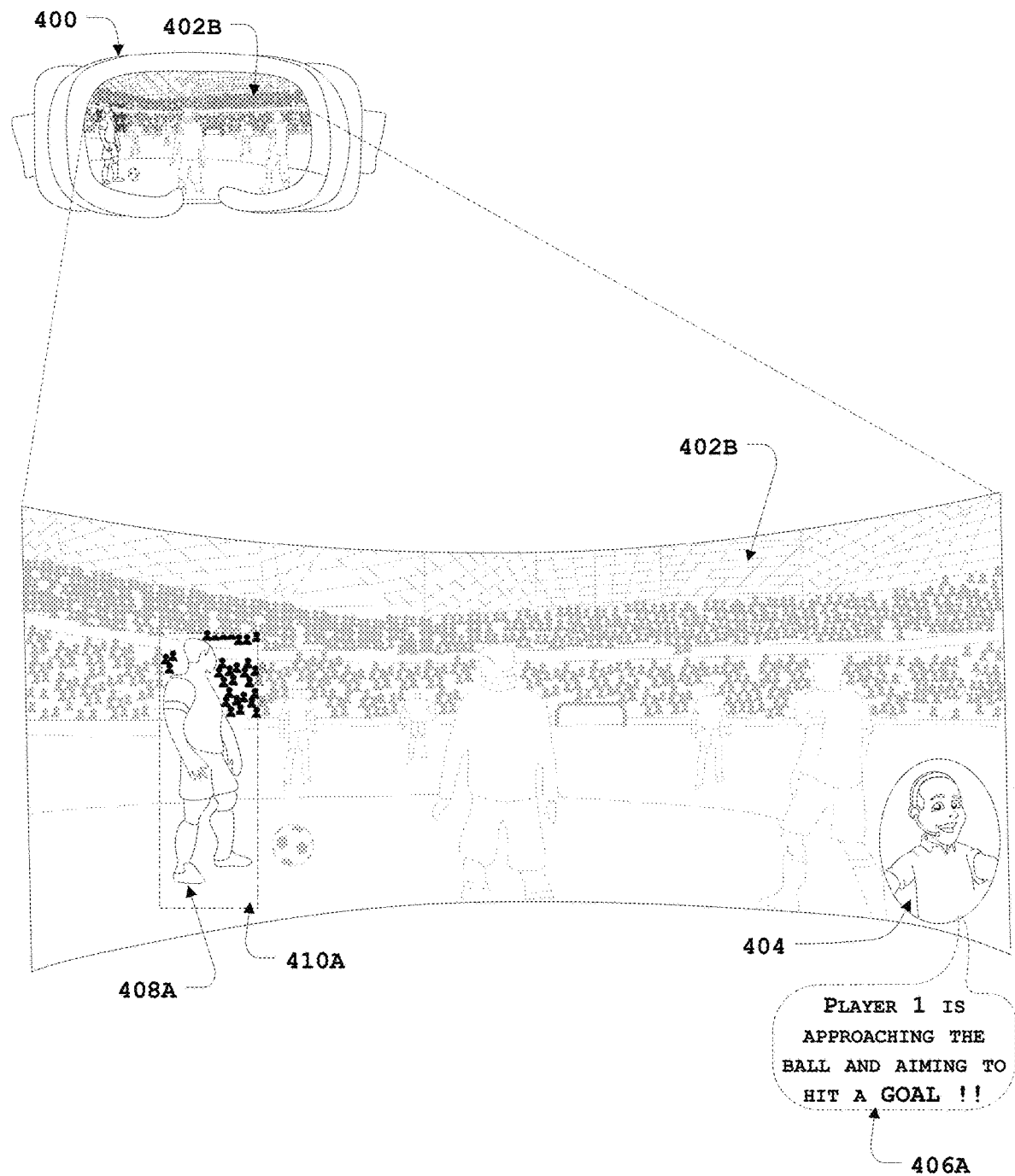

In an embodiment, the object of interest identifying module 304 may be configured to first detect one or more objects in the content 314 that is displayed to the one or more users. One or more image processing techniques, known to a person skilled in the art, may be implemented to detect the one or more objects. Further, the object of interest identifying module 304 may be configured to compare the context with each of the one or more objects. By comparison, the at least one object of interest matching with the context may be identified from the one or more objects displayed to the one or more users when rendering the content 314. In a non-limiting embodiment, other techniques, known to a person skilled in the art may be implemented to identify the at least one object using the context. Consider FIG. 4B, illustrating the virtual telecast of the sport to the one or more users 200. Display of the game played by players is the content 314 and the comment of the commentator 404 is the audio inputs 406A. Consider at an instant of time, the commentor provides audio inputs 406A as "PLAYER 1 IS APPROACHING THE BALL AND AIMING TO HIT A GOAL!!". The object of interest identifying module 304 may be configured to process the comments and derive the context. The context may indicate that the audio inputs 316 is referring to PLAYER 1 amongst the players OF the game. Further, based on the derived context, the object of interest identifying module 304 may identify that the object of interest 408A is PLAYER 1 on the display of the content 314 rendered to the one or more users 200. In a non-limiting embodiment, two or more objects of interest may be identified using the audio inputs. For example, in the scenario illustrated in FIG. 4B, the two or more objects of interest may be PLAYER 1 and ball. In an embodiment, the object of interest may be the commentator 104 as well. The user who is speaking may also be considered to the object of interest.

Upon identifying the object of interest 318, the region of interest determining module 306 may be configured to determine one or more regions of interest 320 in the content 314 rendered to the one or more users. The regions of interest 320 are regions on the display which contains the identified at least one object of interest 318. The content 314 received by the content and audio input receiving module 302 and the identified at least one object of interest 318 may be used to determine the region of interest 320. In an embodiment, each frame of the content 314 which is to be rendered to the one or more users 200 is processed to determine the one or more regions of interest 320. In a non-limiting embodiment, one or more image processing techniques may be implemented to process each frame of the content 314 to be rendered and determine the region of interest 320. In an embodiment, machine learning based techniques may be implemented to determine the one or more regions of interest 320. In an embodiment, classification models may be implemented to determine the one or more regions of interest 320.

In a non-limiting embodiment, the one or more regions of interest 320 may be determined by identifying the presence of the at least one object in a frame from series of frames of the content 314 which is to be displayed to the one or more users. In an embodiment, object classifying techniques may be implemented to identify presence of the at least one object of interest 318. In an embodiment, object matching techniques may be implemented to identify presence of the at least one object of interest 318. Upon identifying the presence, the location of the at least one object of interest 318 in the frame is determined. In an embodiment, localization techniques may be implemented to determine the location of the at least one object. The location is selected to the one or more regions of interest 320 for the frame. In an embodiment, the location may be a bounding box which covers the at least one object within its boundaries. Consider the example illustrated in FIG. 4B. Upon identifying the object of interest 408A to be PLAYER 1, the region of interest determining module 306 may determine of region of interest 410A to be location of the object of interest 408A i.e., PLAYER 1.

Figure 4C:
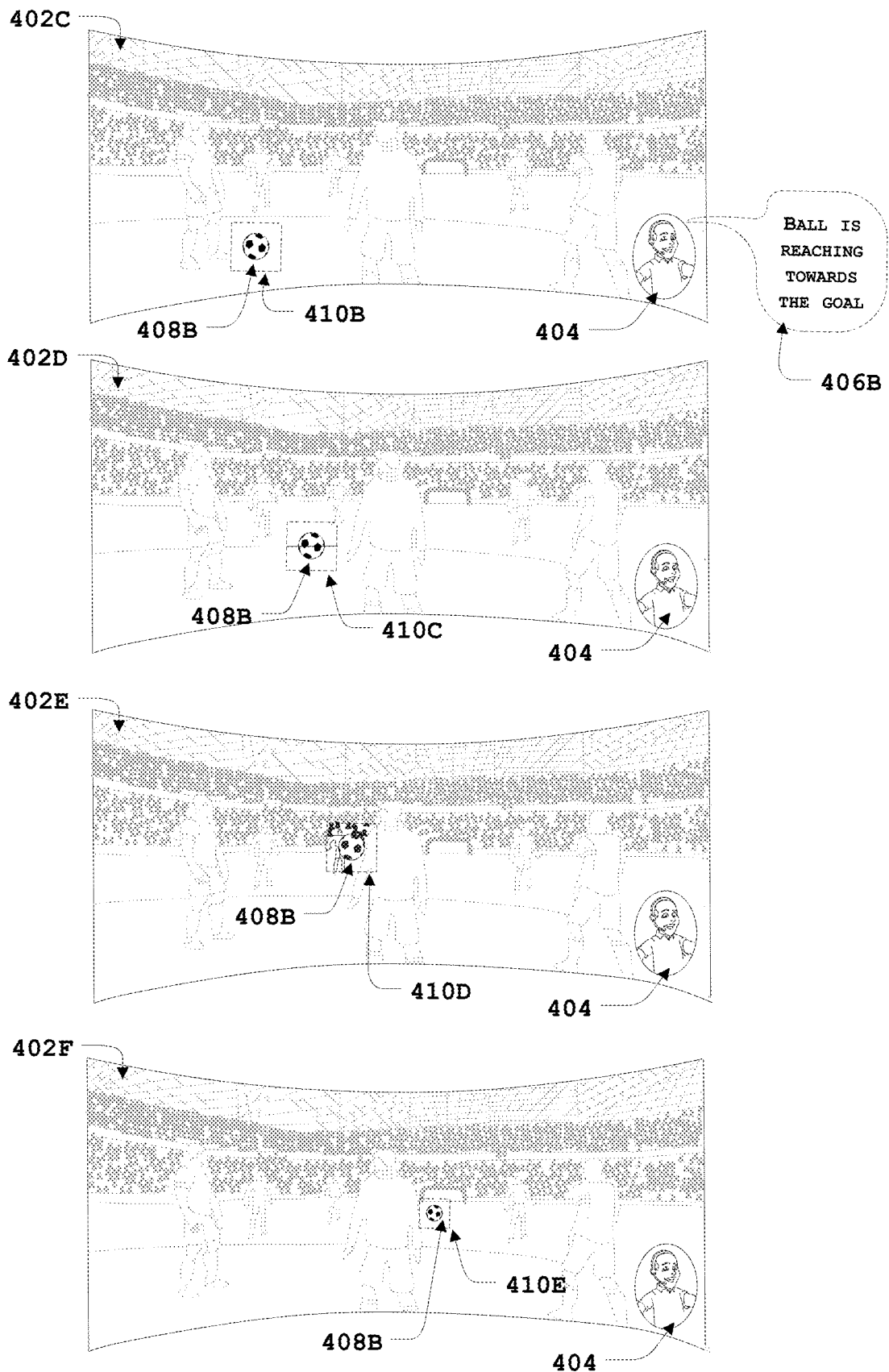

In an alternate embodiment, the region of interest determining module 306 may be configured to determine the one or more regions of interest 320 by identifying presence of the at least one object in a frame, from series of frames of the content 314, to be displayed to the one or more users. Further, the region of interest determining module 306 may be configured to monitor user actions of at least one user, from the one or more users, viewing the at least one object. In an embodiment, the user actions may be movement of eyeball of the user and/or movement of head of the user. In an embodiment, the region of interest determining module 306 may be in communication with one or more sensors to detect the user actions. The one or more sensors may be camera tilt sensors, accelerometers, and so on. The user actions captured by the one or more sensors may be provided to the region of interest determining module 306 to monitor the user actions. In an embodiment, the one or more sensors may be part of the region of interest determining module 306. Further, the region of interest determining module 306 may be configured to update the one or more regions of interest 320 in the series of frames based on the user actions. For example, consider the scenario illustrated in FIG. 4c. During the virtual telecast of the sport, the commentator 404 may provide audio input 316 as "BALL IS REACHING TOWARDS THE GOAL". The content and audio input receiving module 302 may receive the content 314 and the audio input 316 from the commentator 404. The object of interest identifying module 304 may identify the object of interest 408B i.e., the ball. The region of interest determining module 306 may process a frame to identify the region of interest 410B.

Upon determining the one or more regions of interest 320, the bitrate modifying module 308 may be configured to modify bitrate for rendering the content 314. The bitrate is modified based on the determined one or more regions of interest 320. In an embodiment, for modifying the bitrate, the bitrate modifying module 308 may be configured to increase bitrate for rendering the one or more regions of interest 320 of the content 314 in the bandwidth constrained environment. Further, the bitrate modifying module 308 may be configured to decrease bitrate for rendering regions other than the one or more regions of interest 320 of the content 314 in the bandwidth constrained environment. By such modification, the bitrate modifying module 308 may output a modified content 324 for the bandwidth constrained environment. For the example illustrated in FIG. 4B, bitrate for rendering the region of interest may be increased and bitrate for rendering regions other than the region of interest, may be decreased, to obtain the modified content 324. The modified content 324 may be a modified version of a frame which are rendered at different bitrates. Thus, the bandwidth required to optimally render the content to the user may be reduced to accommodate the bandwidth limited environment while not affecting the user's experience. In an embodiment, the bitrate modifying module 308 may implement software codes that function to modify the bitrate for rendering the content. In an embodiment for modifying the bitrate, the bitrate modifying module 308 may be configured to decrease the bitrate for rendering information within regions other than the determined one or more regions of interest 320. The bitrate for rendering information in the one or more regions of interest 320 may be retained. In another embodiment, the bitrate modifying module 308 may be configured to increase the bitrate for rendering information within the determined one or more regions of interest 320. The bitrate for rendering information in regions other than the one or more regions of interest 320 may be retained. Values of bitrates and corresponding regions, used for rendering the modified content is stored as the bitrate data 322 in the memory 116.

In an alternate embodiment, at least one of resolution of the content and the bitrate for the content may be modified to obtain the modified content 324. In such embodiment, resolution of pixels within the region of interest may be increased and resolution of pixels within regions other than the regions of interest 320 may be decreased to obtain the modified content 324.

The outputted modified content is received by the modified content providing module 310 and provided for rendering to the one or more users. In an embodiment, the modified content 324 is provided dynamically to the one or more users, in place of original content that was to be rendered. For the example illustrated in FIG. 4B, the modified content 324 may be frame 402B. In the frame 402B, the region of interest 410A is rendered at higher bitrate and other regions are rendered at lower bitrate. Further, for example illustrated in FIG. 4C, The bitrate modifying module 308 modifies the bitrate to output frame 402C to render to the one or more users. Consider a user is viewing the frame 402C and gazing at the region of interest 410B. For the subsequent frame of the content 314, the region of interest determining module 306 may be configured to monitor user actions of the user. If the eyeball movement or the head movement of the user is moving to view the moving ball across the frames, the regions of interest 320 for the subsequent frame is updates based on movement of the eyeball or the head movement In another embodiment, the subsequent frames may be processed to identify the presence of the object of interest to identify the regions of interest in the subsequent frames. In the illustrated example of FIG. 4C, the regions of interest 320 may be updated to be regions of interest 410C, 410D and 410E. Outputted subsequent frames are represented as frames 402D, 402E and 402F in FIG. 4C. By such rendering, the bandwidth requirement in the bandwidth constrained environment is reduced without impairing the user's experience. Thus, with minimal bandwidth, user's experience in viewing the content is not compromised.

Figure 5:
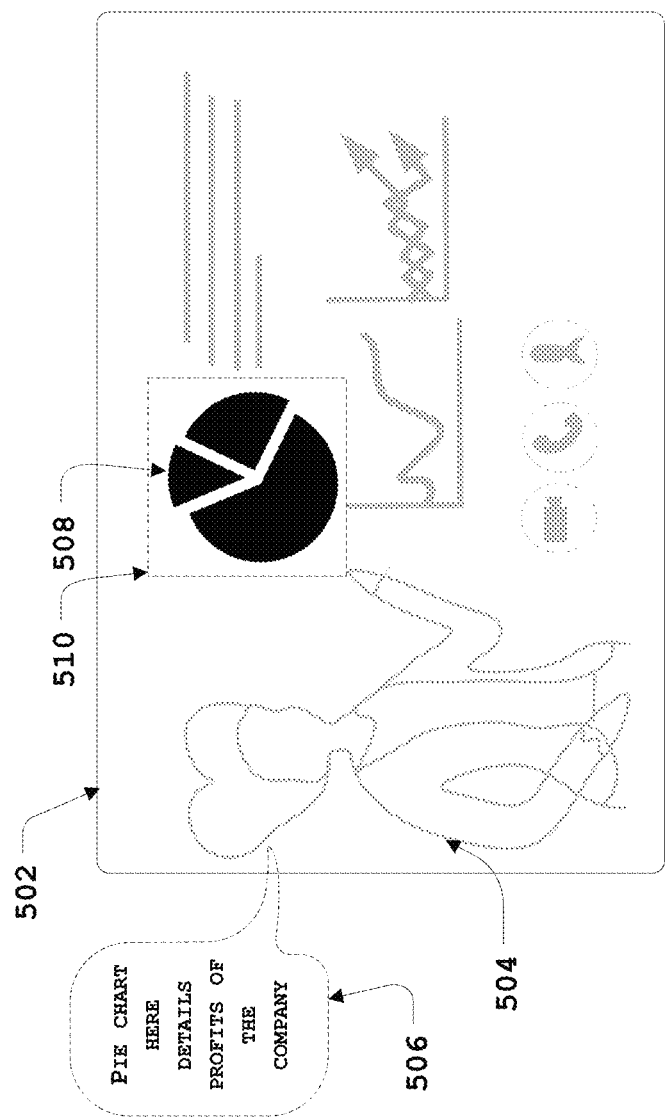
FIG. 5 shows an exemplary embodiment for providing content in a live-telecast environment with bandwidth constraints, in accordance with an embodiment of the present disclosure.

Consider the scenario illustrated in FIG. 5. The bandwidth constrained environment may be an online presentation with a presenter 504 and one or more attendees. The presenter 504 and the one or more attendees may be the one or more users 200. In an embodiment, the display presented by the presenter 504 on user devices of the one or more attendees may be the content, and the narration of the presenter 504 may be audio inputs 316. Consider during the online presentation, the presenter 504 provides audio input 316 as "PIE CHART HERE DETAILS PROFITS OF THE COMPANY". The content and audio input receiving module 302 may receive the content 314 and the audio input 316 from the presenter 504. The object of interest identifying module 304 may identify object of interest 508 i.e., the pie chart displayed in the content 314 rendered to the one or more attendees. In an alternate embodiment, the audio input 316 may be provided by one of the attendees of the presentation as well. For example, consider during the presentation, one of the attendees raises a question related to the pie chart displayed when rendering the content to said attendee. In such case the pie chart may be selected to be the object of interest. The region of interest determining module 306 may process a frame to identify region of interest 510. The bitrate modifying module 308 modifies the bitrate to output frame 502 to render to the one or more attendees. Further, during the presentation, consider the presenter 504 provides audio inputs 316 relating to a graph. A frame (not shown in the figures) with higher bitrate for rendering the region displaying the graph may be outputted and rendered to the one or more attendees. In an embodiment, in a scenario where the modified content is rendered to the multiple users through their corresponding user devices, the modification of the content may be customized to each of the multiple users. For example, in scenario where the audio input 316 is provided by one of the attendees, the content modified based on the audio input 316 may be rendered only to the attendee from whom the audio input 316 is received. However, when audio input 316 is from the presenter, the modified content is provided to all the attendees of the presentation. In an embodiment, the modified content may be rendered only to users who are associated with bandwidth constrained environment. For the user who are associated with no bandwidth constraint, the content may be rendered without any modification.

Figure 6A:
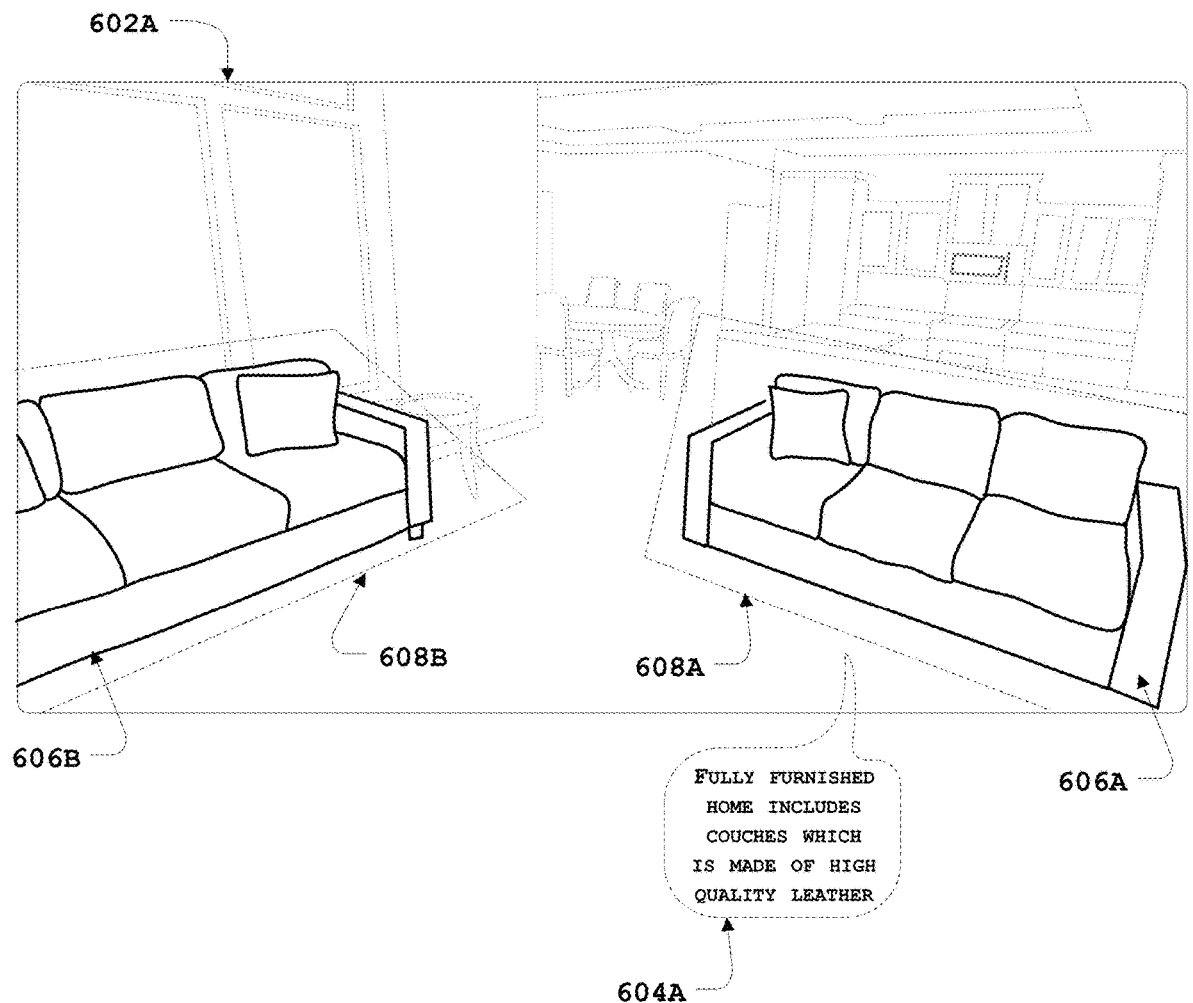
FIGS. 6A and 6B show exemplary embodiments for providing content in a virtual environment with bandwidth constraints, in accordance with an embodiment of the present disclosure.
Figure 6B:
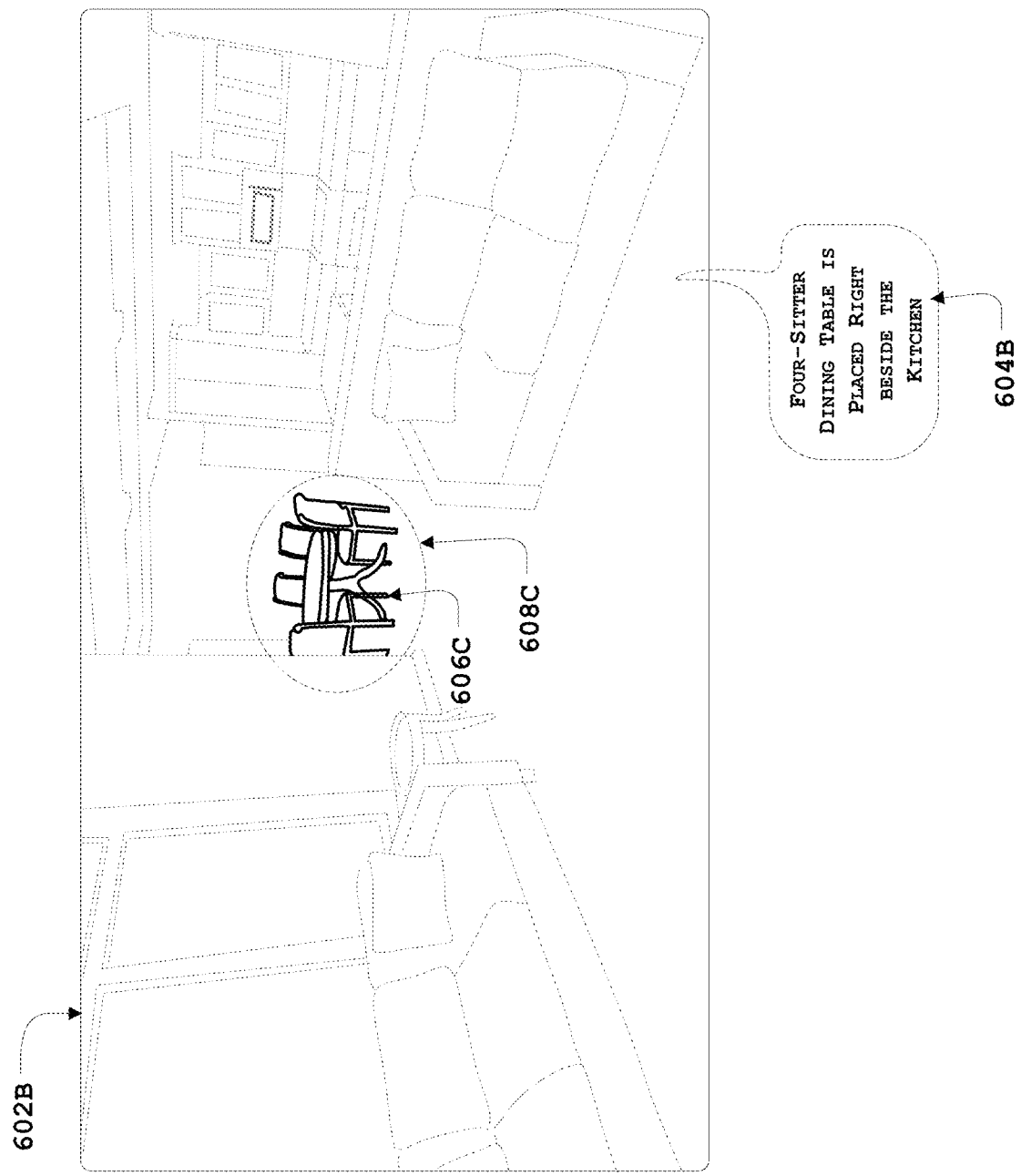

Consider the scenario illustrated in FIG. 6A. The bandwidth constrained environment may be a virtual tour of a house provide by a realtor to a client. The realtor and the client may be the one or more users. The realtor may be presenting the house to the client with a 360 degree view of the house displayed on user device of the client. In an embodiment, the display presented by the realtor may be the content 314 and comments of the realtor or the client may be audio inputs 316. In an embodiment, the audio inputs 316 may be dynamic in nature and may be provided by the realtor or the client, during the virtual tour. In an embodiment, the audio inputs 316 in such scenarios may be a pre-stored audio data which is provided along with displayed content. In an embodiment, the audio inputs 316 may be dynamically generated based on the displayed content. For example, when the display of the virtual tour is controlled by the client, based on currently displayed content, the audio inputs 316 may be generated. When the client is moving towards the dining table, the generated audio inputs 316 may be related to the dining table. When the client turns towards the kitchen, the generated audio inputs 316 may be related to the kitchen. In an embodiment, audio inputs 316 may be provided by the client as well. For example, when the client enquires about appliances in the kitchen. Such enquiry may also be considered as the audio inputs 316. Consider, as shown in FIG. 6A, during the virtual tour, the realtor provides audio input 604A as "FULLY FURNISHED HOME INCLUDES COUSCHES WHICH ARE MADE OF HIGH QUALITY LEATHER". The content and audio input receiving module 302 may receive the content 314 and the audio input 316 from the realtor. The object of interest identifying module 304 may identify objects of interest 606A and 606B i.e., the couches displayed in the content 314 rendered to the client. The region of interest determining module 306 may process a frame to identify regions of interest 608A and 608B. Since the objects of interest 606A and 606B is located at more than one place, all the locations with the objects of interest 606A and 606B shall be considered as the regions of interest 608A and 608B. The bitrate modifying module 308 modifies the bitrate to output frame 602A to render to the client. Further, consider FIG. 6B where, during the virtual tour, the realtor provides audio inputs 604B as "FOUR-SITTER DINING TABLE IS PLACED RIGHT BESIDE THE KITCHEN". The content and audio input receiving module 302 may receive the content 314 and the audio input 316 from the realtor. The object of interest identifying module 304 may identify object of interest 606C i.e., dining table displayed in the content 314 rendered to the client. The region of interest determining module 306 may process a frame to identify region of interest 608C. In an embodiment, the region of interest may be of a shape that is required to cover the object of interest 318 within in boundary. The region of interest may be a square, rectangular, circular, trapezoidal, oval or any freeform shape. In an embodiment, the region of interest may be outline of edges of the object of interest 318. Upon identifying the region of interest 608C, the bitrate modifying module 308 modifies the bitrate to output frame 602B to render to the client.

In some non-limiting embodiments or aspects, the processing unit 102 may receive data for rendering data in the bandwidth constrained environment via the I/O interface 112. The received data may include, but is not limited to, at least one of the content data 314, the audio input data 316, user actions and the like. Also, the processing unit 102 may transmit data for rendering data in the bandwidth constrained environment via the I/O interface 112. The transmitted data may include, but is not limited to, the object of interest data 318, the region of interest data 320, bitrate data, modified content data 324 and the like.

Figure 7:
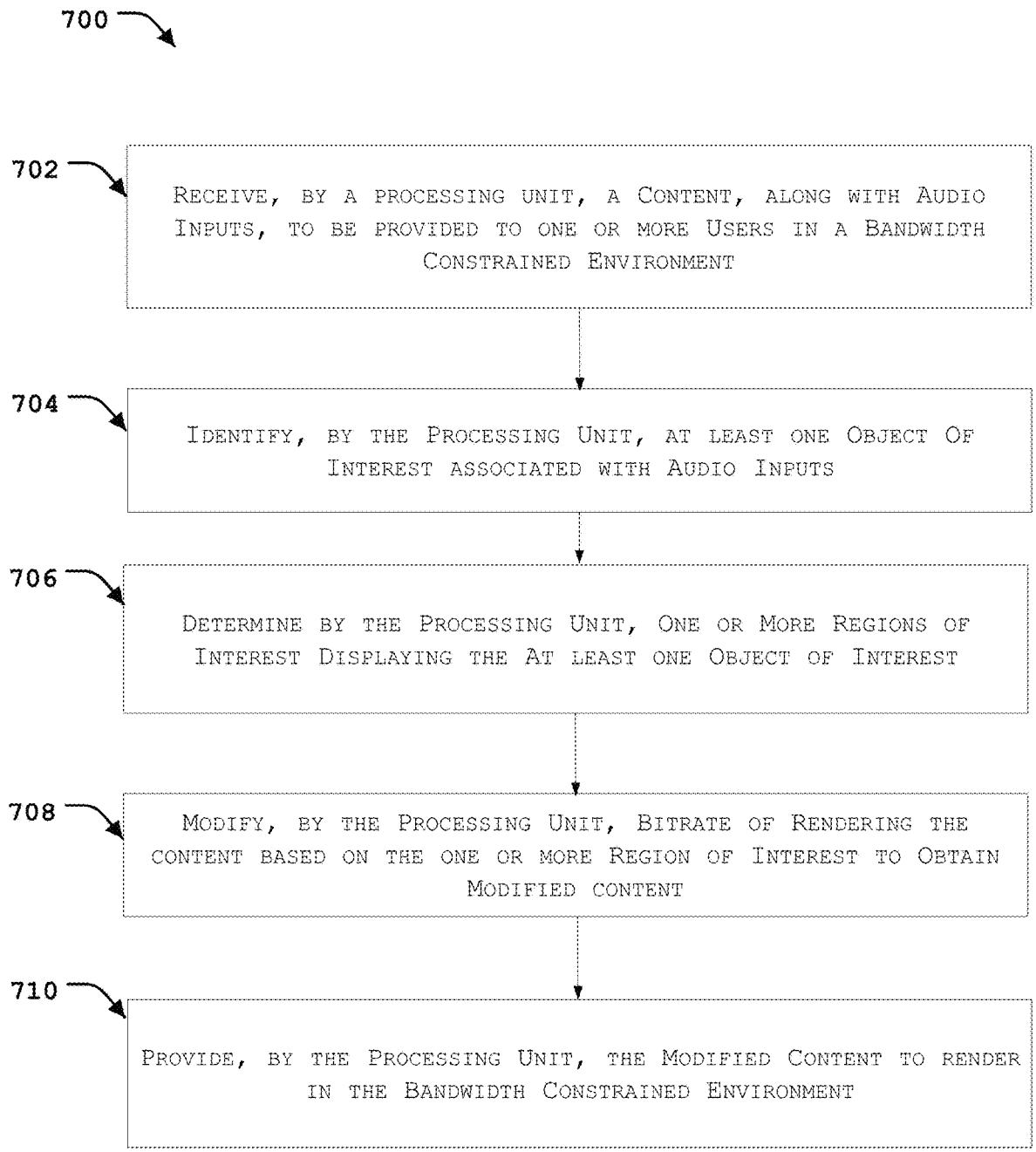
FIG. 7 is an exemplary process of processing unit for providing content in a bandwidth constrained environment, in accordance with an embodiment of the present disclosure.

The other data 226 may comprise data, including temporary data and temporary files, generated by modules for performing the various functions of the processing unit 102. The one or more modules may also include other modules 212 to perform various miscellaneous functionalities of the processing unit 102. It will be appreciated that such modules may be represented as a single module or a combination of different modules FIG. 7 shows an exemplary process of a processing unit for providing content in a bandwidth constrained environment, in accordance with an embodiment of the present disclosure. Process 700 for rendering the content includes steps coded in form of executable instructions to be executed by a processing unit associated with user devices connected with bandwidth constrained environment.

At block 702, the processing unit is configured to receive content, along with audio inputs, which is to be provided to one or more users in a bandwidth constrained environment. In an embodiment, the audio inputs may at least be part of the rendered content which may be predefined or be dynamically provided by at least one user from the one or more users during rendering of the content or be machined generated voice data provided to user during rendering of the content.

At block 704, the processing unit is configured to identify at least one object of interest associated with the audio inputs.

At block 706, the processing unit is configured to determine one or more regions of interest, displaying the at least one object of interest, in the bandwidth constrained environment. At block 708, the processing unit is configured to modify bitrate for rendering the content, based on the determined one or more regions of interest, to obtain a modified content for the bandwidth constrained environment.

At block 710, the processing unit is configured to provide the modified content to render in the bandwidth constrained environment.

Figure 8:
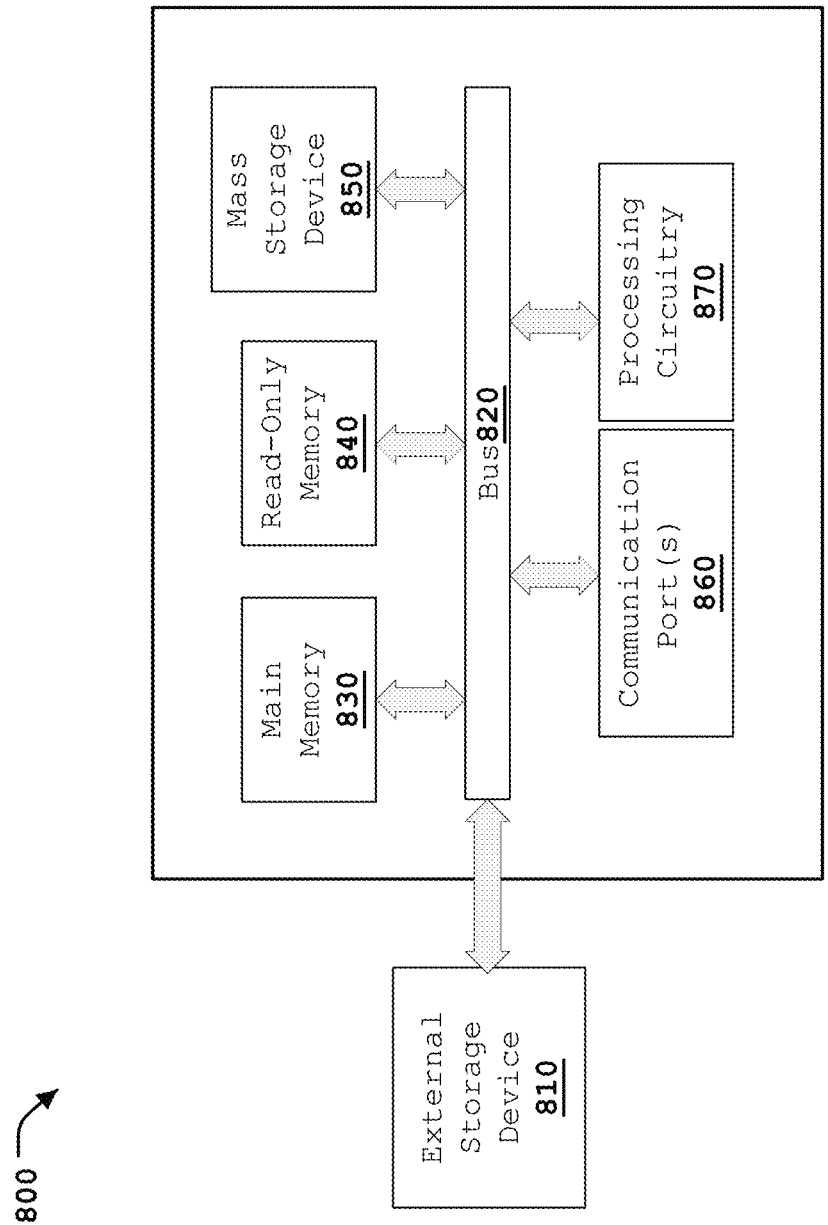
FIG. 8 illustrates an exemplary computer unit in which or with which embodiments of the present invention may be utilized.

FIG. 8 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 8, the computer system 800 includes an external storage device 810, bus 820, main memory 830, read-only memory 840, mass storage device 850, communication port(s) 860, and processing circuitry 870.

Those skilled in the art will appreciate that the computer system 800 may include more than one processing circuitry 870 and one or more communication ports 860. The processing circuitry 870 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 870 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 870 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 870 may include various modules associated with embodiments of the present disclosure.

The communication port 860 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 860 may be any RS-232 port for use with a modem-based dialup connection, a 10/100 Ethernet port, a Gigabit, or a 10 Gigabit port using copper or fiber, a serial port, a parallel port, or other existing or future ports. The communication port 860 may be chosen depending on a network, such as a Local Area Network (LAN), Wide Area Network (WAN), or any network to which the computer system 800 may be connected.

The main memory 830 may include Random Access Memory (RAM) or any other dynamic storage device commonly known in the art. Read-only memory (ROM) 840 may be any static storage device(s), e.g., but not limited to, a Programmable Read-Only Memory (PROM) chips for storing static information, e.g., start-up or BIOS instructions for the processing circuitry 870.

The mass storage device 850 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 830. The mass storage device 850 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 820 communicatively couples the processing circuitry 870 with the other memory, storage, and communication blocks. The bus 820 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 870 to the software system.

Optionally, operator and administrative interfaces, e.g., a display, keyboard, and a cursor control device, may also be coupled to the bus 820 to support direct operator interaction with the computer system 800. Other operator and administrative interfaces may be provided through network connections connected through the communication port(s) 860. The external storage device 810 may be any kind of external hard drives, floppy drives, IOMEGA® Zip Drives, Compact Disc—Read-Only Memory (CD-ROM), Compact Disc—Re-Writable (CD-RW), Digital Video Disk—Read Only Memory (DVD-ROM). The components described above are meant only to exemplify various possibilities. In no way should the aforementioned exemplary computer system limit the scope of the present disclosure.

The computer system 800 may be accessed through a user interface. The user interface application may be implemented using any suitable architecture. For example, it may be a stand-alone application wholly implemented on the computer system 800. The user interfaces application and/or any instructions for performing any of the embodiments discussed herein may be encoded on computer-readable media. Computer-readable media includes any media capable of storing data. In some embodiments, the user interface application is a client-server-based application. Data for use by a thick or thin client implemented on electronic device computer system 800 is retrieved on-demand by issuing requests to a server remote to the computer system 800. For example, computer system 800 may receive inputs from the user via an input interface and transmit those inputs to the remote server for processing and generating the corresponding outputs. The generated output is then transmitted to the computer system 800 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

We claim:

1. A method for providing content in a bandwidth constrained environment, the method comprising:
   receiving, by a processing unit, a content along with audio inputs received during rendering of the content and provided to one or more users in a bandwidth constrained environment;
   identifying, by the processing unit, at least one object of interest within the content based on the received audio inputs, wherein identifying the at least one object of interest associated with the audio inputs comprises:
      processing the audio inputs using a Natural Language Processing (NLP) model associated with the processing unit, to derive context related to the at least one object of interest; and
      identifying the at least one object in the display of the content based on the derived context;
   determining, by the processing unit, one or more regions of interest based on the at least one object of interest, such that the one or more regions of interest include the at least one object of interest, in the bandwidth constrained environment;
   modifying, by the processing unit, bitrate for rendering the content, based on the determined one or more regions of interest, to obtain a modified content for the bandwidth constrained environment; and
   providing, by the processing unit, the modified content to be rendered in the bandwidth constrained environment.

2. The method of claim 1, wherein determining the one or more regions of interest comprises:
   identifying presence of the at least one object in a frame, from series of frames of the content, to be displayed to the one or more users;
   determining location of the at least one object of interest in the frame; and
   selecting the determined location to be the one or more regions of interest for the frame, for modifying the bitrate.

3. The method of claim 1, wherein determining the one or more regions of interest comprises:
   identifying presence of the at least one object in a frame, from series of frames of the content, to be displayed to the one or more users;
   monitoring user actions of at least one user, from the one or more users, viewing the at least one object; and
   updating the one or more regions of interest in the series of frames based on the user actions.

4. The method of claim 1, wherein the user actions comprise at least one of head movement and eyeball movement of the at least one user.

5. The method of claim 1, wherein modifying the bitrate for rendering the content comprises:

increasing bitrate for rendering the one or more regions of interest of the content in the bandwidth constrained environment; and decreasing bitrate for rendering regions other than the one or more regions of interest, of the content in the bandwidth constrained environment.

6. The method of claim 1, wherein the environment is an immersive environment and the content is an immersive content to be rendered to the one or more users.

7. A processing unit for providing content in a bandwidth constrained environment, the processing unit comprises:
one or more processors; and
a memory communicatively coupled to the one or more processors, wherein the memory stores processor-executable instructions, which, on execution, cause the one or more processors to:
receive content along with audio inputs received during rendering of the content and provided to one or more users in a bandwidth constrained environment;
identify at least one object of interest within the content based on the received audio inputs, wherein the at least one object is identified based on derived context from the audio inputs;
determine one or more regions of interest based on the at least one object of interest, such that the one or more regions of interest include interest based on the at least one object of interest, such that the one or more regions of interest include the at least one object of interest, in the bandwidth constrained environment;
modify bitrate for rendering the content, based on the determined one or more regions of interest, to obtain a modified content for the bandwidth constrained environment; and
provide the modified content to be rendered in the bandwidth constrained environment.

8. The processing unit of claim 7, wherein the one or more processors are configured to determine the one or more regions of interest by:
identifying presence of the at least one object in a frame, from series of frames of the content, to be displayed to the one or more users;
determining location of the at least one object of interest in the frame; and
selecting the determined location to be the one or more regions of interest for the frame, for modifying the bitrate.

9. The processing unit of claim 7, wherein the one or more processors are configured to determine the one or more regions of interest by:
identifying presence of the at least one object in a frame, from series of frames of the content, to be displayed to the one or more users;
monitoring user actions of at least one user, from the one or more users, viewing the at least one object; and
updating the one or more regions of interest in the series of frames based on the user actions.

10. The processing unit of claim 7, wherein the user actions comprise at least one of head movement and eyeball movement of the at least one user.

11. The processing unit of claim 7, wherein the one or more processors are configured to modify the bitrate for rendering the content comprises:

increasing bitrate for rendering the one or more regions of interest of the content in the bandwidth constrained environment; and decreasing bitrate for rendering regions other than the one or more regions of interest.

12. The processing unit of claim 7, wherein the environment is an immersive environment and the content is an immersive content to be rendered to the one or more users.

13. A non-transitory computer-readable medium including instructions stored thereon that when processed by one or more processors cause a processing unit to perform operations comprising:
receiving content along with audio inputs received during rendering of the content and provided to one or more users in a bandwidth constrained environment;
identifying at least one object of interest within the content based on the received audio inputs, wherein the at least one object is identified based on derived context from the audio inputs;
determining one or more regions of interest based on the at least one object of interest, such that the one or more regions of interest include the at least one object of interest, in the bandwidth constrained environment;
modifying bitrate for rendering the content, based on the determined one or more regions of interest, to obtain a modified content for the bandwidth constrained environment; and
providing the modified content to be rendered in the bandwidth constrained environment.

14. The medium of claim 13, wherein determining the one or more regions of interest comprises:
identifying presence of the at least one object in a frame, from series of frames of the content, to be displayed to the one or more users;
determine location of the at least one object of interest in the frame; and
selecting the determined location to be the one or more regions of interest for the frame, for modifying the bitrate.

15. The medium of claim 13, wherein determining the one or more regions of interest comprises:
identifying presence of the at least one object in a frame, from series of frames of the content, to be displayed to the one or more users;
monitoring user actions of at least one user, from the one or more users, viewing the at least one object; and
updating the one or more regions of interest in the series of frames based on the user actions.

16. The medium of claim 13, wherein the user actions comprise at least one of head movement and eyeball movement of the at least one user, wherein the environment is an immersive environment and the content is an immersive content to be rendered to the one or more users.

17. The medium of claim 13, wherein modifying the bitrate for rendering the content comprises:
increasing bitrate for rendering the one or more regions of interest of the content in the bandwidth constrained environment; and
decreasing bitrate for rendering regions other than the one or more regions of interest, of the content in the bandwidth constrained environment.

* * * * *